Feb. 23, 1932. G. Q. LEWIS 1,846,495
FRICTION SHOCK ABSORBING MECHANISM
Filed May 29, 1929
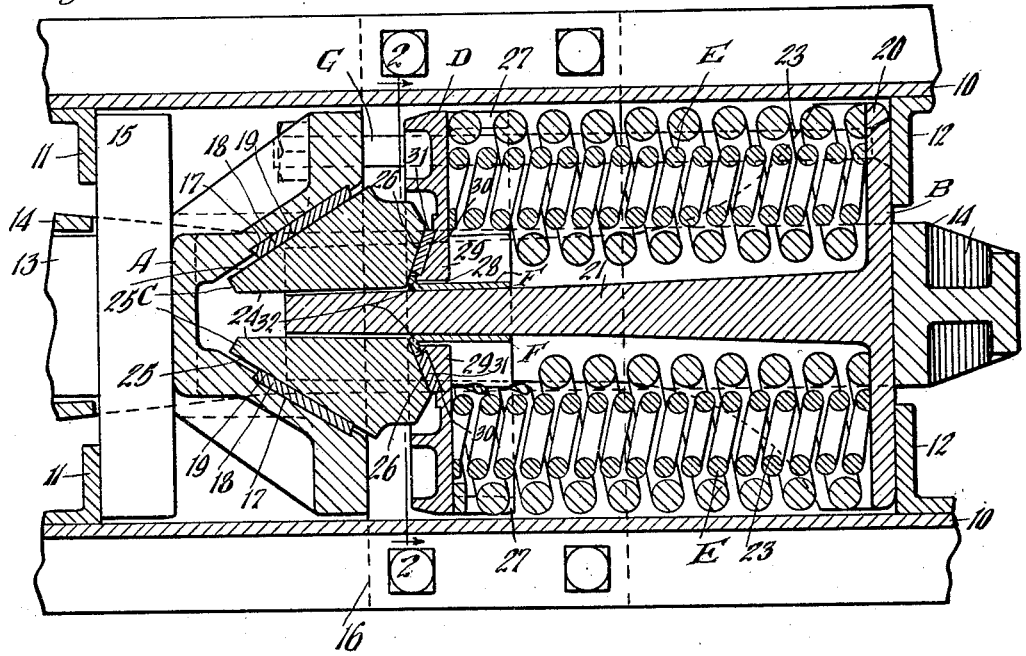
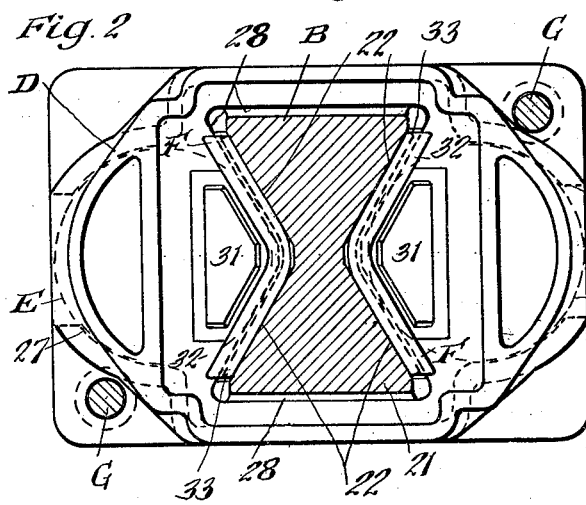
Inventor
Goodrich Q. Lewis
By Joseph Harris
His Atty.
Witness
Wm. Geiger Patented Feb. 23, 1932

1,846,495

UNITED STATES PATENT OFFICE

GOODRICH Q. LEWIS, OF WHEATON, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed May 29, 1929. Serial No. 366,784.

This invention relates to improvements in friction shock absorbing mechanisms.

In railway practice, in order to insure the efficient and proper operation of friction shock absorbing mechanisms employed in connection with railway draft riggings of cars, it is highly important that the friction surfaces of such mechanisms be kept free from grit and dirt and also be protected from the elements so as to maintain the working surfaces in substantially perfect condition. As will be evident, exposure to the elements subjects the friction surfaces to damage due to corrosion and the collection of dirt and grit on the surfaces quickly injures the same by abrasive action and scoring, in addition to preventing proper contact between the surfaces. In certain types of friction gears employed on railway cars, the friction surfaces are more or less exposed and therefore subject to the damage pointed out. This is especially the case in connection with friction gears of that type having movable friction elements arranged about a central friction means in the form of a column or post provided with exterior friction surfaces.

One object of the invention is to prevent damage to the friction surfaces of the type of gear indicated, by shielding the friction surfaces against exposure.

A further object of the invention is to provide in a friction shock absorbing mechanism including a friction post and friction shoes cooperation with exterior friction surfaces on the post, means for shielding the exterior friction surfaces, wherein the shielding means protects the working surfaces of the post inwardly of that portion of the post overlapped by the friction shoes in the normal full release position of the mechanism.

A more specific object of the invention is to provide in a friction shock absorbing mechanism including a central column having exterior friction surfaces and cooperating friction shoes movable lengthwise of the friction surfaces of the column, shielding means for the friction surfaces of the column, wherein the shielding means extends rearwardly from the shoes and overlaps the friction surfaces of the column and is movable with the shoes lengthwise of the column friction surfaces.

Other objects of the invention will more clearly appear from the description and claims hereinafter following.

In the drawings, forming a part of this specification, Figure 1 is a horizontal, longitudinal, sectional view through the underframe structure at one end of a car, illustrating my improvements in connection therewith. Figure 2 is a vertical, transverse, sectional view corresponding substantially to the line 2—2 of Figure 1. And Figure 3 is a detailed perspective view of a shielding plate employed in connection with my improved mechanism.

In said drawings, 10—10 indicate channel-shaped center or draft sills of the railway car underframe, to the inner sides of which are secured the usual front stop lugs 11—11 and rear stop lugs 12—12. The inner end portion of the coupler shank is designated by 13 and a hooded yoke 14 of well known form is operatively connected to the coupler shank. A front main follower 15 and my improved shock absorbing mechanism are disposed within the yoke and the yoke in turn is supported in operative position by a detachable saddle plate 16 secured to the bottom flanges of the draft sills.

My improved shock absorbing mechanism comprises broadly a wedge casing A; a combined rear follower and column member B; a pair of friction shoes C—C; a spring follower D; a spring resistance E; a pair of shielding plates F—F, and a pair of retainer bolts G—G.

The wedge casing A has horizontal top and bottom walls, inwardly diverging side walls and a transverse front end wall bearing directly on the inner side of the main follower 15. The side walls are suitably reinforced by horizontally extending webs and are recessed on their inner sides as indicated at 17—17 to provide pockets in which are seated wear plates 18—18. The wear plates 18 present opposed interior wedge faces 19—19 which diverge inwardly of the mechanism.

The combined rear follower and column member B includes a plate-like section 20 having a forwardly extending post 21 formed integral therewith. The plate-like section 20 cooperates with the rear stop lugs 12 in the manner of the usual rear follower. The post or column section 21 has longitudinally extending outwardly converging friction surfaces 22 of V-shape section on opposite sides thereof. The post 21 and plate 20 are reinforced by top and bottom horizontally extending webs 23—23 on opposite sides thereof.

The friction shoes C—C are two in number and are disposed at opposite sides of the post 21 and cooperate with the longitudinally disposed friction surfaces 22 thereof. The two shoes are of similar design, each having a longitudinally disposed V-shaped friction surface 24 on the inner side thereof engaging with the V-shaped friction surface 22 at the corresponding side of the post. On the outer side each shoe has a wedge face 25 correspondingly inclined to and cooperating with the wedge face 19 at the same side of the casing A. At the inner end each shoe has a laterally inclined abutment face 26 which engages the spring follower D.

The spring follower D is in the form of a relatively heavy rectangular plate having top and bottom and vertically disposed side flanges 27 extending rearwardly therefrom, the vertical side flanges being cut away at the center as shown in Figure 1 to accommodate the outer sides of the members of the spring resistance means. At the forward side, the spring follower is reinforced by suitable horizontally and vertically disposed ribs as shown. At the rear side, the spring follower presents a substantially flat, transverse abutment surface against which the forward ends of the members of the spring resistance bear. The post 21 extends through the spring follower, the latter being provided with a central opening 28 to accommodate the post, the opening 28 being of an outline corresponding to the cross section of the post and being slightly larger than the post so as to permit the necessary inward movement of the spring follower during compression of the mechanism without any binding on the post. The main body portion of the spring follower is thickened about the opening 28 as indicated at 29. The thickened portion 29 is provided with a pair of seats or pockets 30 at opposite sides thereof. The inner walls of the pockets are inclined as shown and a pair of wear plates 31—31 are seated in said pockets and have their outer faces in bearing engagement with the inclined abutment faces 26 at the inner ends of the friction shoes.

The spring resistance means comprises two members disposed at opposite sides of the post, each member comprising an inner, relatively light coil and an outer heavier coil. The members of the spring resistance are interposed between the plate-like section 20 of the combined rear follower and column member B and the spring follower D. The shielding plates F are disposed at opposite sides of the posts immediately to the rear of the friction shoes C—C. The two plates F—F are of similar design, each being of substantially V-shape transverse section so as to interfit with the corresponding friction surface 22 of the post. At the forward end each plate F is provided with an outwardly and inwardly turned flange section 32 which, as most clearly shown in Figure 1, is disposed between the inner end of the friction shoe at the corresponding side of the mechanism and the front side of the spring follower D. The flange 32 is inclined so as to correspond with the inclination of the abutment face 26 at the inner end of said shoe and is of such a thickness as to substantially occupy the space between the abutment face 26 of the shoe and the opposed face of the thickened portion 29 at the front side of the spring follower D. As will be evident, each shielding plate F is thus held to the spring follower and the corresponding friction shoe for movement lengthwise of the mechanism therewith. Inasmuch as the inner end of the friction shoe directly engages the flange 32 of the plate F, the same will be forced inwardly in unison with said shoe. In release of the mechanism, when the spring follower D is forced outwardly, the same will carry the shielding plates F therewith by engagement with the flanges 32 of the same. The plates F are preferably made of such a length as to at least cover those portions of the friction surfaces of the post which are disposed rearwardly of the friction shoes in the normal full release position of the parts. Sufficient clearance is provided between the side walls of the opening 28 of the spring follower D and the friction plates and sufficient clearance is also provided between the outer edges of the flanges 32 of said plates and the inner edges of the wear plates 31 to permit the necessary lateral separation of the plates F during inward movement of the same along the diverging friction surfaces of the post. The outer coils of the spring resistance elements are of such a diameter that they engage the plates F as shown in dotted lines in Fig. 2, thereby yieldingly holding the plates in engagement with the V-shaped surfaces of the post in all positions of the plates. The plates F may be made of any suitable material but are preferably in the form of steel plate members. As will be evident, these plates may also be made of copper or other material which does not corrode.

As most clearly shown in Figures 2 and 3, the outer edge portions at opposite sides of the plates F are rounded off as indicated at 33—33, thereby preventing the raw edges of the plates from engaging and damaging the friction surfaces of the post.

The mechanism is held assembled and of overall uniform length by the two retainer bolts G—G which are disposed at diagonally opposite corners of the mechanism and extend lengthwise thereof, and have their opposite ends anchored to the plate 20 and the wedge casing A respectively. The parts are preferably so adjusted when assembled that the main spring resistance E is under initial compression, thereby compensating for wear of the various wedge faces and friction surfaces of the mechanism.

In the operation of my improved shock absorbing mechanism, the wedge casing A and the combined rear follower and column member B are moved inwardly, relatively toward each other, thereby setting up a wedging action between the wedge faces of the member A and the friction shoes forcing the latter laterally inwardly into intimate frictional contact with the friction surfaces of the post and also carrying the same inwardly lengthwise of the post. During the inward movement of the shoes on the post, the spring resistance means E will be compressed between the spring follower D and the plate-like follower section 20 of the member B. As the shoes C are forced inwardly along the post 21, the shielding plates F will be carried therewith, sliding on the friction surfaces of the post. Inward movement of the casing A will be limited by engagement of the end wall thereof with the front end of the post, whereupon the actuating force is transmitted directly through the post and the plate-like follower section 20 of the member B to the stop lugs of the draft sills, thus relieving the main spring resistance from excessive compression.

When the actuating force is reduced in release of the mechanism, the expansive action of the spring resistance means forces the spring follower outwardly carrying the shoes and wedge casing A therewith. The main follower 15 will thus be restored to the normal full release position. As the spring follower D is carried outwardly, the shielding plates F will be carried therewith by engagement of the flanges 32 thereof with the follower and will be returned to the release position shown in Figure 1.

As will be evident from the preceding description taken in connection with the drawings, the shielding plates F fully protect the exterior working friction surfaces of the post in all positions of the parts during operation of the shock absorbing mechanism. Inasmuch as these plates are at least as great in length as the active portions of the friction surfaces rearwardly of the shoes, they fully cover the same and prevent entrance of dust, dirt and grit between the same and the friction surfaces of the post. It is further pointed out that the shielding plates protect the friction surfaces of the post from the elements, thereby preventing corrosion of the same. It will be appreciated that the collection of dirt and grit on the friction surfaces of the post is detrimental to the proper operation of the friction gear, first because the foreign matter between the friction surfaces of the post and shoes will prevent proper contact between these parts and any gritty matter will cause damage to the friction surfaces of the post and shoes by scratching and scoring. It is further obvious that corrosion of the friction surfaces renders the same inefficient.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a column member having exterior friction surfaces extending lengthwise thereof; of friction shoes cooperating with said friction surfaces; means yieldingly opposing relative movement of the shoes and column; means movable toward and away from said column for forcing the shoes inwardly against the same and lengthwise of the friction surfaces thereof; and shielding means for the friction surfaces of the column rearwardly of the shoes, said shielding means being at least as great in length as the active friction surface rearwardly of the shoes, and said shielding means being movable with the shoes.

2. In a friction shock absorbing mechanism, the combination with a follower; of a column having longitudinally disposed exterior friction surfaces, said column and follower being relatively movable toward and away from each other; friction shoes engaging the friction surfaces of the column and having wedging engagement with the follower; a spring follower engaging the inner ends of the shoes; spring resistance means opposing inward movement of the spring follower and shoes; and shielding means for the friction surfaces of the post extending rearwardly from the spring follower, said means being movable with the friction shoes.

3. In a friction shock absorbing mechanism, the combination with a column member having longitudinally disposed friction surfaces; of a friction shoe cooperating with each friction surface of the post; means for forcing said shoes against the post and lengthwise thereof; means yieldingly opposing movement of the shoes; and a shielding plate overlying each friction surface of the post adjacent each shoe, said shielding plate being slidable on said friction surface and movable with the corresponding shoe.

4. In a friction shock absorbing mechanism, the combination with a column member having longitudinally extending exterior friction surfaces; of friction shoes slideable lengthwise of the column; means yieldingly opposing relative movement of the shoes and column; means for forcing the shoes inwardly against the column and lengthwise thereof; and cover means normally completely overlying the active friction surfaces of the column inwardly of the friction shoes, said cover means being slideable over said column friction surfaces.

5. In a friction shock absorbing mechaanism, the combination with a column having longitudinally disposed exterior friction surfaces; of a friction shoe having sliding engagement with each friction surface of the column; means for forcing said shoes against the column and moving the same lengthwise thereof; spring resistance means opposing inward movement of the shoes; a spring follower interposed between the spring resistance means and the shoes, said spring follower having an opening through which the post extends; and protecting plates fitting the friction surfaces of the column, each of said plates extending through the opening of the spring follower and having an out turned end flange interposed between the spring follower and the corresponding shoe adapted to be engaged by the shoe, whereby said plate is moved inwardly in unison with the shoe during compression of the mechanism, said flange having shouldered engagement with the spring follower whereby the plate is moved outwardly in unison with the spring follower during release of the mechanism.

6. In a friction shock absorbing mechanism, the combination with a friction column having exterior friction surfaces extending lengthwise thereof; of cooperating friction elements movable lengthwise of said surfaces; and means inwardly of said elements protecting the friction surfaces of the column, said means and elements together in full release position thereof completely overlapping the active portions of the friction surfaces of the friction column.

In witness that I claim the foregoing I have hereunto subscribed my name this 27th day of May 1929.

GOODRICH Q. LEWIS.